United States Patent
Yan et al.

(10) Patent No.: US 10,096,134 B2
(45) Date of Patent: Oct. 9, 2018

(54) DATA COMPACTION AND MEMORY BANDWIDTH REDUCTION FOR SPARSE NEURAL NETWORKS

(71) Applicant: NVIDIA Corporation, Santa Clara, CA (US)

(72) Inventors: Zhou Yan, Shanghai (CN); Franciscus Wilhelmus Sijstermans, Los Altos Hills, CA (US); Yuanzhi Hua, Ningbo (CN); Xiaojun Wang, Shanghai (CN); Jeffrey Michael Pool, Durham, NC (US); William J. Dally, Los Altos Hills, CA (US); Liang Chen, Beijing (CN)

(73) Assignee: NVIDIA Corporation, Santa Clara, CA (US)

( * ) Notice: Subject to any disclaimer, the term of this patent is extended or adjusted under 35 U.S.C. 154(b) by 121 days.

(21) Appl. No.: 15/422,359

(22) Filed: Feb. 1, 2017

(65) Prior Publication Data

US 2018/0218518 A1     Aug. 2, 2018

(51) Int. Cl.
  *H03M 7/00*   (2006.01)
  *G06T 9/00*   (2006.01)
  *G06T 1/20*   (2006.01)
  *G06T 1/60*   (2006.01)

(52) U.S. Cl.
  CPC ............. *G06T 9/002* (2013.01); *G06T 1/20* (2013.01); *G06T 1/60* (2013.01)

(58) Field of Classification Search
  CPC ............. G06T 9/002; G06T 1/20; G06T 1/60
  USPC ..................... 341/50–51, 65, 67, 87
  See application file for complete search history.

(56) References Cited

U.S. PATENT DOCUMENTS 6,885,320 B2 *   4/2005   Kim ............... H03M 7/40
                                                    341/50
2016/0358069 A1 *  12/2016   Brothers ........... G06F 7/764

OTHER PUBLICATIONS

Han et al., "EIE: Efficient Inference Engine on Compressed Deep Neural Network," 2016 ACM/IEEE 43rd Annual International Symposium on Computer Architecture, 2016, pp. 243-254.
Albericio et al., "Cnvlutin: Ineffectual-Neuron-Free Deep Neural Network Computing," 2016 ACM/IEEE 43rd Annual International Symposium on Computer Architecture, 2016, pp. 1-13.

(Continued)

*Primary Examiner* — Khai M Nguyen
(74) *Attorney, Agent, or Firm* — Zilka-Kotab, P.C.

(57) ABSTRACT

A method, computer program product, and system for sparse convolutional neural networks that improves efficiency is described. Multi-bit data for input to a processing element is received at a compaction engine. The multi-bit data is determined to equal zero and a single bit signal is transmitted from the memory interface to the processing element in lieu of the multi-bit data, where the single bit signal indicates that the multi-bit data equals zero. A compacted data sequence for input to a processing element is received by a memory interface. The compacted data sequence is transmitted from the memory interface to an expansion engine. Non-zero values are extracted from the compacted data sequence and zeros are inserted between the non-zero values by the expansion engine to generate an expanded data sequence that is output to the processing element.

21 Claims, 8 Drawing Sheets

(56) References Cited

OTHER PUBLICATIONS

Chen et al., "Eyeriss: A Spatial Architecture for Energy-Efficient Dataflow for Convolutional Neural Networks," 2016 ACM/IEEE 43rd Annual International Symposium on Computer Architecture, 2016, pp. 367-379.
Chen et al., "14.5 Eyeriss: An energy-efficient reconfigurable accelerator for deep convolutional neural networks," 2016 IEEE International Solid-State Circuits Conference (ISSCC), pp. 1-3.

\* cited by examiner

DATA COMPACTION AND MEMORY BANDWIDTH REDUCTION FOR SPARSE NEURAL NETWORKS

FIELD OF THE INVENTION

The present invention relates to deep learning acceleration, and more particularly to data compaction and zero gating for a sparse convolutional neural network.

BACKGROUND

Driven by the availability of massive data and the computational capability to process it, deep learning has recently emerged as a critical tool for solving complex problems across a wide range of domains, including image recognition, speech processing, natural language processing, language translation, video analytics, and autonomous vehicles. Convolutional neural networks (CNNs) have become the most popular algorithmic approach for deep learning for many of these domains. High performance and extreme energy efficiency are critical for deployments of CNNs in a wide range of situations, especially mobile platforms such as autonomous vehicles, cameras, and electronic personal assistants.

Employing CNNs can be decomposed into two tasks: (1) training—in which the parameters of a neural network are learned by observing massive numbers of training examples, and (2) classifying—in which a trained neural network is deployed in the field and classifies the observed data. Today, training is often done on graphics processing units (GPUs) or farms of GPUs, while inference depends on the application and can employ central processing units (CPUs), GPUs, field-programmable gate arrays (FPGAs), or application-specific integrated circuits (ASICs).

During the training process, a deep learning expert will typically architect the network, establishing the number of layers, the operation performed by each layer, and the connectivity between layers. Many layers have parameters, typically filter weights, which determine exact computation performed by the layer. The objective of the training process is to learn the filter weights, usually via a stochastic gradient descent-based excursion through the space of weights. The training process typically employs a forward-propagation calculation for each training example, a measurement of the error between the computed and desired output, and then back-propagation through the network to update the weights. Inference has similarities, but only includes the forward-propagation calculation. Nonetheless, the computation requirements for inference can be prohibitively large, particularly with the emergence of deeper networks (hundreds of layers) and larger inputs sets, such as high-definition video. Furthermore, the energy efficiency of this computation is important, especially for mobile platforms, such as autonomous vehicles, cameras, and electronic personal assistants. The computation requirements and energy consumption of a neural network for machine learning presents challenges for mobile platforms. Thus, there is a need for addressing these issues and/or other issues associated with the prior art.

SUMMARY

A method, computer program product, and system for a deep learning accelerator that improves efficiency of neural network calculations is described. Multi-bit data for input to a processing element is received at a compaction engine. The multi-bit data is determined to equal zero and a single bit signal is transmitted from the memory interface to the processing element in lieu of the multi-bit data, where the single bit signal indicates that the multi-bit data equals zero. A compacted data sequence for input to a processing element is received by a memory interface. The compacted data sequence is transmitted from the memory interface to an expansion engine. Non-zero values are extracted from the compacted data sequence and zeros are inserted between the non-zero values by the expansion engine to generate an expanded data sequence that is output to the processing element.

DETAILED DESCRIPTION

Neural networks typically have significant redundancy and can be pruned dramatically during training without substantively affecting accuracy of the neural network. The number of weights that can be eliminated varies widely across the layers but typically ranges from 20% to 80% Eliminating weights results in a neural network with a substantial number of zero values, which can potentially reduce the computational requirements of inference.

The inference computation also offers a further optimization opportunity. In particular, many neural networks employ the rectified linear unit (ReLU) function that clamps all negative activation values to zero as a non-linear operator. The activations are the output values of an individual layer that are passed as inputs to the next layer. For typical data sets, 50-70% of the activations are clamped to zero. Since the multiplication of weights and activations is the key computation for inference, the combination of activations that are zero and weights that are zero can reduce the amount of computation required by over an order of magnitude. A deep learning accelerator (DLA) architecture described herein, exploits weight and/or activation sparsity to reduce energy consumption.

Figure 1A:
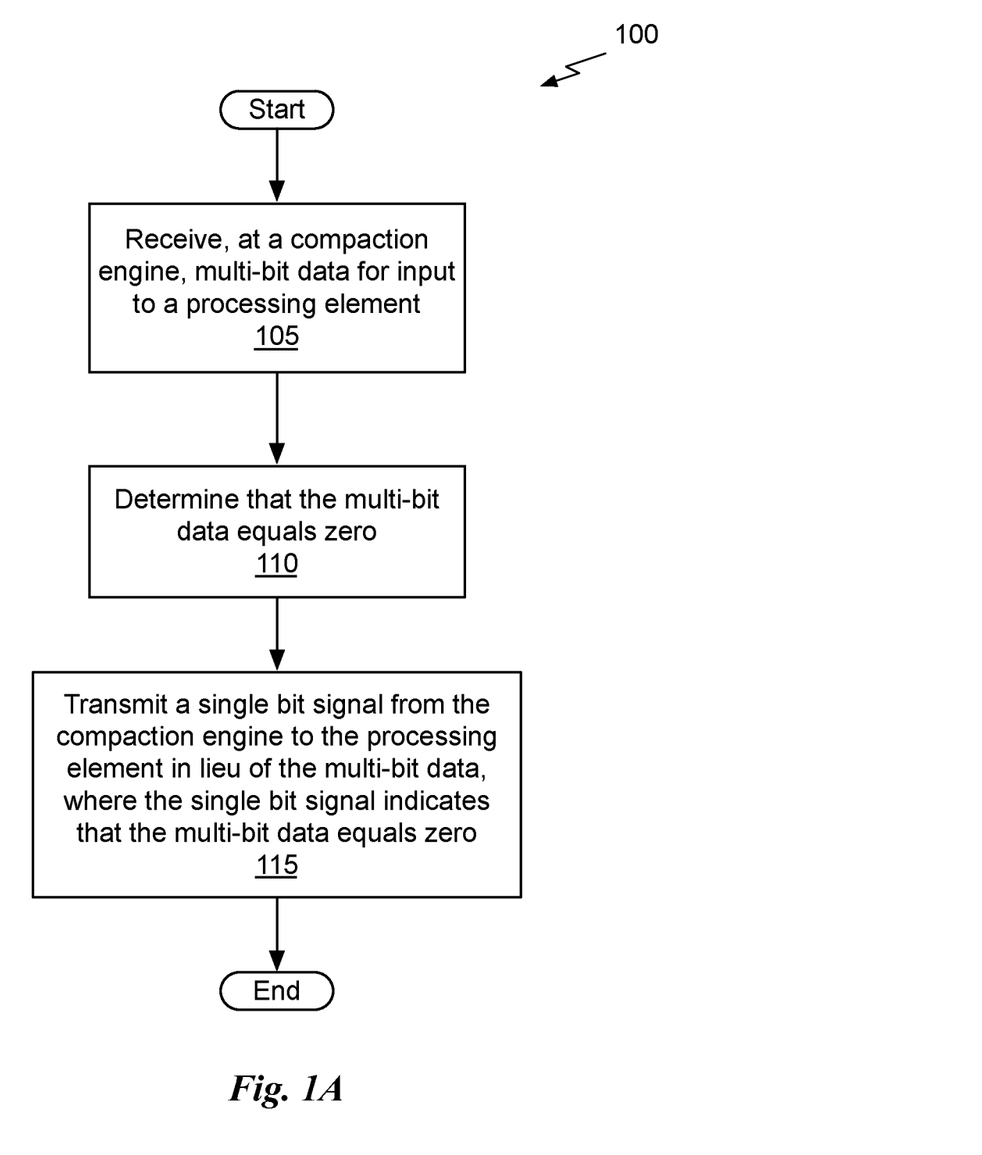
FIGS. 1A illustrates a flowchart of a method for zero gating in a Deep Learning Accelerator (DLA), in accordance with one embodiment.

FIG. 1A illustrates a flowchart of a method 100 for zero gating in a deep learning accelerator, in accordance with one embodiment. Although method 100 is described in the context of a processing element within a DLA, the method 100 may also be performed by a program, custom circuitry, or by a combination of custom circuitry and a program. Additionally, the method 100 may be performed by a variant of a DLA, such as a CNN or a recursive CNN. Furthermore, persons of ordinary skill in the art will understand that any system that performs method 100 is within the scope and spirit of embodiments of the present invention.

At step 105, multi-bit data for input to a processing element (PE) is received by a compaction engine. In one embodiment, the multi-bit data is received by a memory interface from a memory before the multi-bit data is transmitted to the compaction engine. In one embodiment, the multi-bit data represents a weight value, where the weights define a filter. In one embodiment, the multi-bit data represents an input activation value that is generated by a layer of the neural network. In one embodiment, the multi-bit data is received by a DLA, such as the DLA 200 described in conjunction with FIG. 2A.

At step 110, the multi-bit data is determined to equal zero. In one embodiment, the DLA 200 determines that the multi-bit data equals zero when the multi-bit data is less than a predetermined threshold value. In another embodiment, the DLA 200 determines that the multi-bit data equals zero when each bit of the multi-bit data is cleared (e.g., has a logic low value, is set to 0, etc.). At step 115, a single bit signal is transmitted by the compaction engine to the PE in lieu of the multi-bit data, where the single bit signal indicates that the multi-bit data equals zero. In one embodiment, a memory interface within the DLA 200 determines that the multi-bit data equals zero and generates the single bit. In one embodiment, when the single bit signal indicates that the multi-bit data equals zero, the multi-bit data is not transmitted to the PE. Transmitting only the single bit may reduce the number of transitions on buses within the DLA 200, further reducing energy consumption. In one embodiment, the single bit is used by the PE to generate a zero as a product of a multiplication operation without performing the multiplication. In one embodiment, the single bit is used by the PE to generate a value as a result of an accumulation (e.g., addition or subtraction) operation without performing the accumulation. Avoiding multiplication and accumulation operations may also reduce energy consumption.

Additional benefits can be achieved by a compressed or compact encoding for sparse weights and/or activations that include several zeros, thus allowing more weight and/or activation values to fit in on-chip random access memory (RAM) and reducing the number of energy-costly dynamic random access memory (DRAM) accesses to read activations and weights. Furthermore, transmitting the compact encoding may reduce the number of transitions on buses, further reducing energy consumption. In one embodiment, a compacted data sequence for input to a PE is received by the DLA, where the compacted data sequence comprises at least one single bit signal indicating that at least one multi-bit value equals zero, and the single bit signal is transmitted to the PE in lieu of the multi-bit value. The compacted data sequence may be received by a memory interface from a memory. The compacted data sequence may represent input activation values or weight values.

Figure 1B:
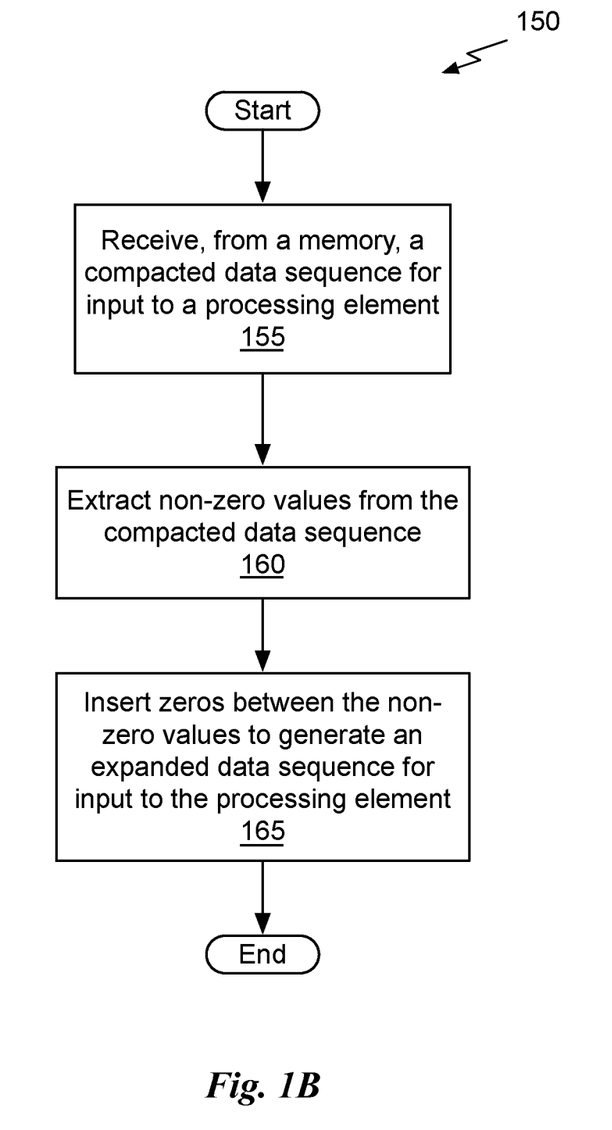
FIG. 1B illustrates a flowchart of a method for data expansion in a DLA, in accordance with one embodiment.

FIG. 1B illustrates a flowchart of a method 150 for data expansion in a sparse convolutional neural network, in accordance with one embodiment. Although method 150 is described in the context of a processing element within a DLA, the method 150 may also be performed by a program, custom circuitry, or by a combination of custom circuitry and a program. Additionally, the method 150 may be performed by a variant of a DLA, such as a CNN or a recursive CNN. Furthermore, persons of ordinary skill in the art will understand that any system that performs method 150 is within the scope and spirit of embodiments of the present invention.

At step 155, a compacted data sequence for input to a PE is received from a memory. The compacted data sequence encodes multi-bit data including zero and non-zero values. In one embodiment, the compacted data sequence is a run-length encoded sequence. In one embodiment, the compacted data sequence is a bit vector and non-zero values.

At step 160, non-zero values are extracted from the compacted data sequence. In one embodiment, the zero and non-zero values encoded in the compacted data sequence represent input activations. In one embodiment, the zero and non-zero values encoded in the compacted data sequence represent weights. In one embodiment, the compacted data sequence is received by a DLA, such as the DLA 200 described in conjunction with FIG. 2A. In one embodiment, the DLA 200 extracts the non-zero values from the compacted data sequence. At step 165, zeros are inserted between the non-zero values to generate an expanded data sequence for input to the PE.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Deep Learning Accelerator

Figure 2A:
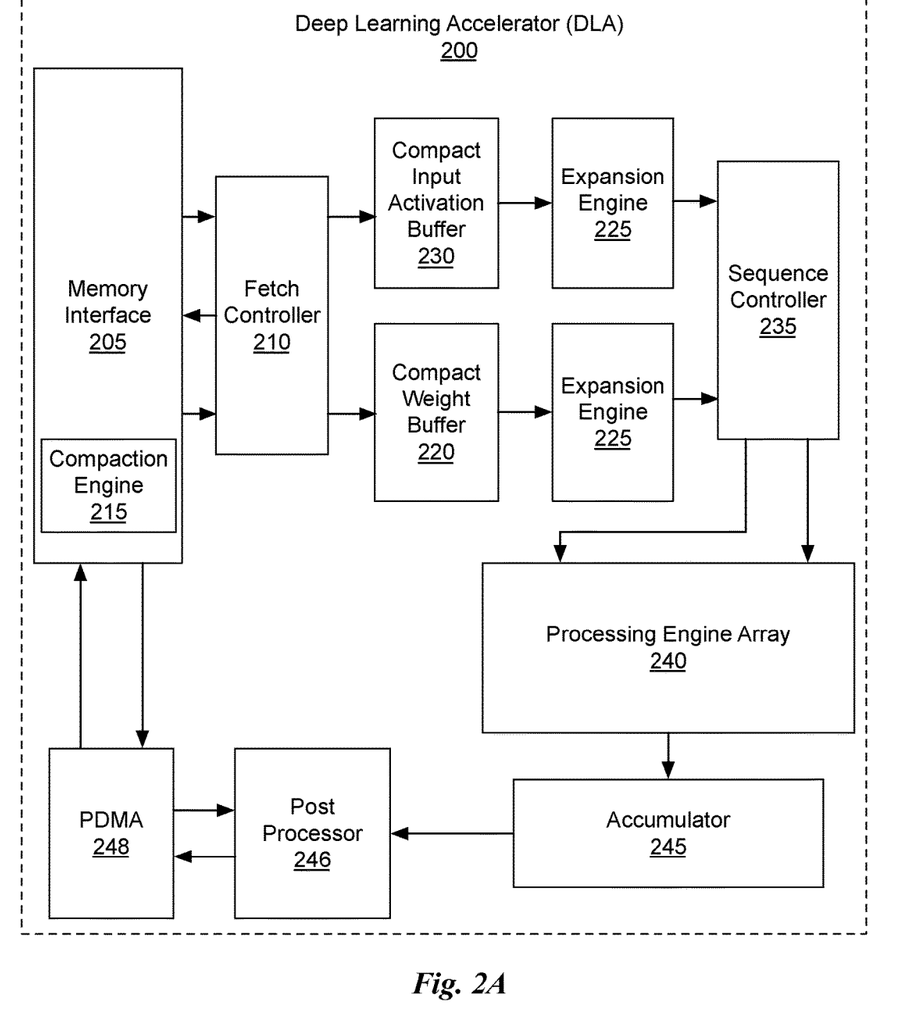
FIG. 2A illustrates a block diagram of a DLA, in accordance with one embodiment.

FIG. 2A illustrates a block diagram of the DLA 200, in accordance with one embodiment. DLA 200 couples an algorithmic dataflow that eliminates all multiplications with a zero operand while transmitting a compact representation of weights and/or input activations between memory and logic blocks within the DLA 200. The DLA 200 includes a memory interface 205, fetch controller 210, compact input activation buffer 230, compact weight buffer 220, expansion engines 225, sequence controller 235, processing element (PE) array 240, accumulator 245, post processor 246, and power division multiple access (PDMA) 248.

The memory interface 205 reads and writes weight and activation data from memory coupled to the DLA 200. The weight and activation data may be stored in the memory in a compact format. The memory may be implemented using dynamic random access memory (DRAM), or the like. A compaction engine 215 within the memory interface 205 is configured to compact multi-bit data, such as the weights, input activations, and output activations. The fetch controller 210 controls the reading of the memory to obtain the compact input activations and compact weights. The compact input activations and compact weights are stored in the compact input activation buffer 230 and the compact weight buffer 220, respectively. The compact input activation buffer 230 and the compact weight buffer 220, may be implemented as register files, or other suitable storage circuits.

The compact activation inputs and compact weights are output by the compact input activation buffer 230 and the compact weight buffer 220, respectively, as compacted data sequences to be converted to an expanded format by the expansion engines 225. The expansion engines 225 may be configured to perform the steps of method 150 to generate expanded data sequences of weights and input activations that include multi-bit zero and non-zero values. Importantly, when the weights and input activations are compacted, only non-zero weights and input activations are transferred from the memory interface 205 through the fetch controller 210 to the compact input activation buffer 230 and the compact weight buffer 220. Similarly, only non-zero weights and input activations are transferred from the compact input activation buffer 230 and the compact weight buffer 220 to the expansion engines 225.

In one embodiment, the input activations are not compacted and are instead stored in the compact input activation buffer 230 in expanded format and the expansion engine 225 that is coupled between the compact input activation buffer 230 and the sequence controller 235 is omitted. In one embodiment, the weights are not compacted and are instead stored in the compact weight buffer 220 in expanded format and the expansion engine 225 that is coupled between the compact weight buffer 220 and the sequence controller 235 is omitted.

The sequence controller 235 receives the expanded weight data sequence and the expanded input activations data sequence and outputs operands to be multiplied within the PE array 240. In one embodiment, the sequence controller 235 broadcasts a set of weights to each PE within the PE array 240 and sequences through sets of input activations before broadcasting another set of weights.

Each PE in the PE array 240 includes a multiplier that accepts a set of weights and a set of input activations, where the multiplier is configured to generate a product from one input activation in the set of input activations and one weight in the set of weights. In one embodiment, the PE array 240 is configured to perform convolution operations on the weights and input activations.

The accumulator 245 within the DLA 200 accumulates the results generated by the PE array 240 to complete the convolution operation by generating output activations. The output activations for one layer of the neural network are the input activations for the next layer of the neural network. The post-processor 246 performs tasks like non-linear mapping (e.g. ReLU) and pooling. In one embodiment, a second compaction engine 215 is included within the post processor 246 to compact the output activations generated by the accumulator 245. The PDMA 248 stores the layer's output values to an internal or external memory.

The DLA 200 may be configured to implement convolutional Neural Network (CNNs) algorithms that are a cascaded set of pattern recognition filters trained with supervision. A CNN consists of a series of layers, which include convolutional layers, non-linear scalar operator layers, and layers that downsample the intermediate data, for example by pooling. The convolutional layers represent the core of the CNN computation and are characterized by a set of filters that are usually 1×1 or 3×3, and occasionally 5×5 or larger. The values of these filters are the weights that are trained using a training set for the network. Some deep neural networks (DNNs) also include fully-connected layers, typically toward the end of the DNN. During inference, a new image (in the case of image recognition) is presented to the network, which classifies into the training categories by computing in succession each of the layers in the network. The intermediate data between the layers are called activations and the output activation of one layer becomes the input activation of the next layer. The DLA 200 accelerates the convolutional layers, receiving weights and input activations and generating output activations.

Sparsity in a layer of a CNN is defined as the fraction of zeros in the layer's weight and input activation matrices. The primary technique for creating weight sparsity is to prune the network during training. In one embodiment, any weight with an absolute value that is close to zero (e.g. below a defined threshold) is set to zero. In one embodiment, the compaction engine 215 sets weights having absolute values below a defined threshold to zero. If the weights are in a compacted format, the compaction engine 215 reformats the weights as needed after setting one or more weights to zero to produce compacted weights. The pruning process has the effect of removing weights from the filters, and sometimes even forcing an output activation to always equal zero. The remaining network may be retrained, to regain the accuracy lost through naïve pruning. The result is a smaller network with accuracy extremely close to the original network. The process can be iteratively repeated to reduce network size while maintaining accuracy.

Activation sparsity occurs dynamically during inference and is highly dependent on the data being processed. In one embodiment, activations having negative values are clamped to zero. In one embodiment, input activations having an absolute value below a defined threshold are set to zero. In one embodiment, the compaction engine 215 sets (input and/or output) activations that are below a defined threshold to zero. If the activations are in a compacted format, the compaction engine 215 reformats the activations as needed after setting one or more activations to zero to produce compacted activations. After completing computation of a convolutional layer, each element in the output activation matrices that is below a threshold value may be set to zero before the output activation data is passed to the next layer.

Figure 2B:
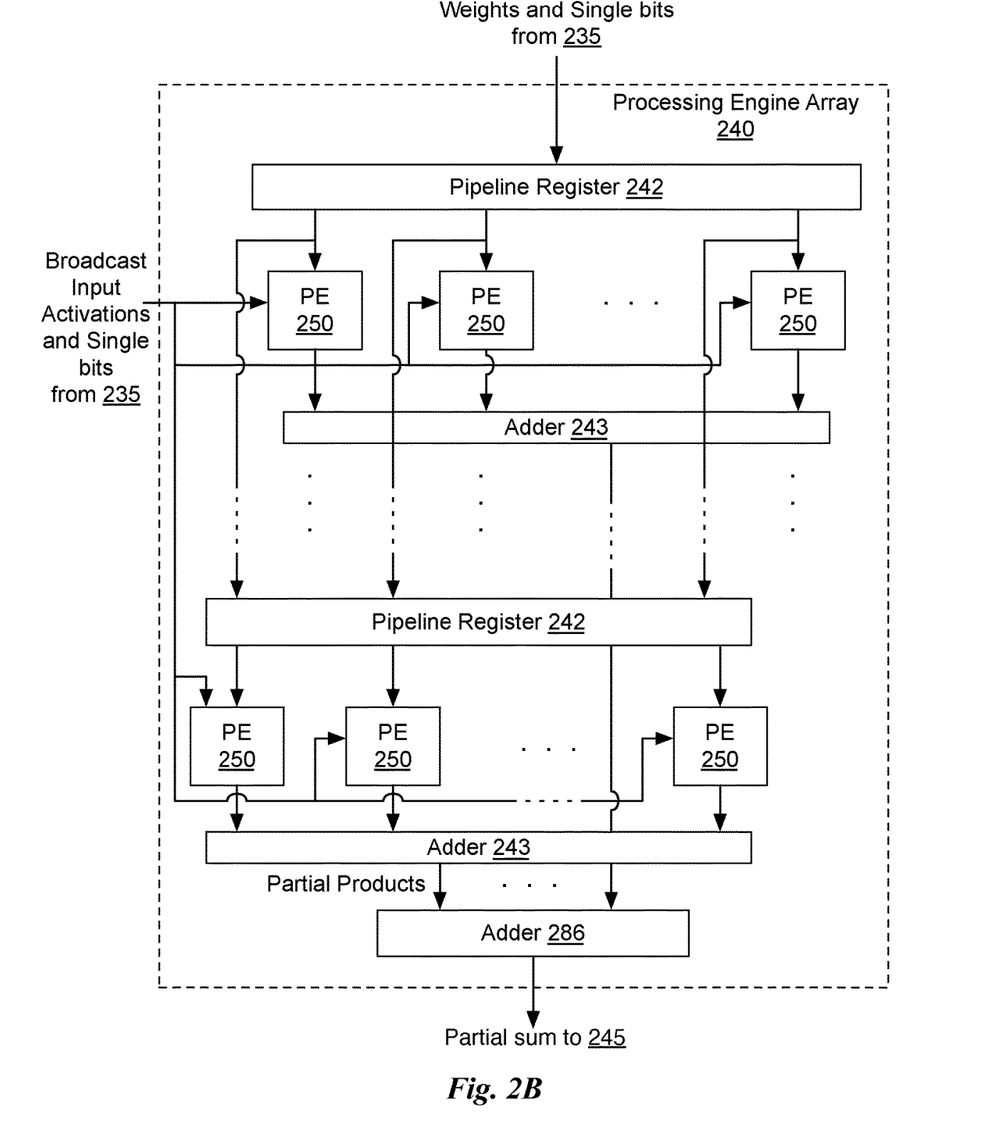
FIG. 2B illustrates a block diagram of a processing element array, in accordance with one embodiment.

FIG. 2B illustrates a block diagram of a processing engine array 240, in accordance with one embodiment. The sequence controller 235 broadcasts a set of input activations to each PE within the PE array 240. The sequence controller 235 sequences through sets of weights before broadcasting another set of input activations. Therefore, the input activation values are held at the first input to each of the PEs 250 for multiple processing cycles while the weight values and single bits at the second input to each of the PEs 250 are updated each processing cycle. Each set of weights (e.g., weight values and single bits) is pipelined through the processing engine array 240 by pipeline registers 242. The output of each pipeline register 242 is input to another pipeline register 242 and each pipeline register 242 represents a pipeline stage.

Each of the PEs 250 generates a product by multiplying a weight value and an input activation. The products for each pipeline stage are summed by an adder 243 to produce a partial product. The partial products generated by the PEs 250 in the PE array 240 are summed by an adder 286 and the resulting partial sum is output to the accumulator 245.

Figure 2C:
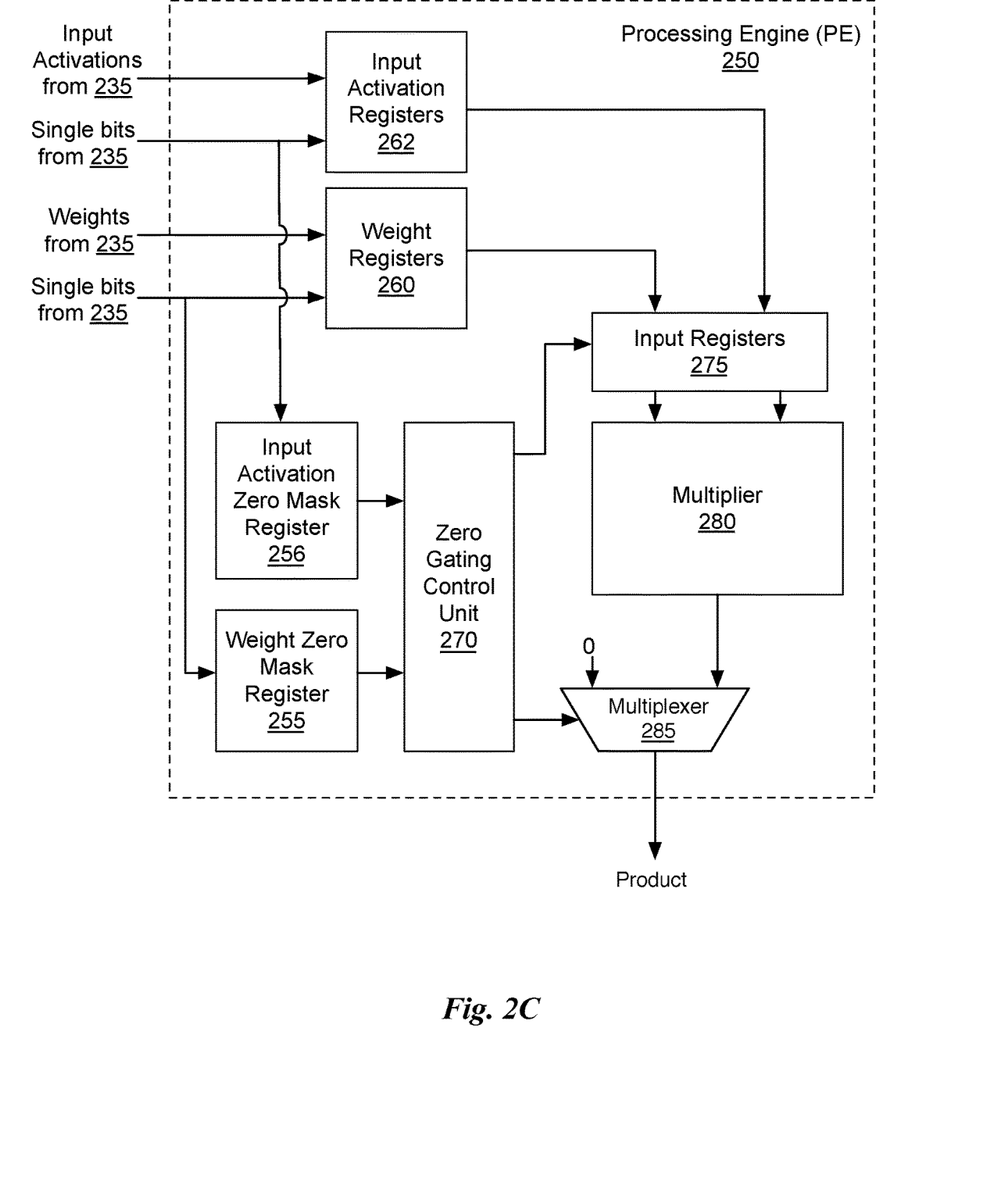
FIG. 2C illustrates a block diagram of a Processing element, in accordance with one embodiment.

FIG. 2C illustrates a block diagram of a PE 250, in accordance with one embodiment. Multiple PEs 250 are included within the PE array 240 shown in FIG. 2B. Each PE 250 includes an input activation zero mask register 256, a weight zero mask register 255, input activation registers 262, weight registers 260, zero gating control unit 270, input registers 275, a multiplier 280, and a multiplexer 285.

The expansion engine 225 generates the expanded sequence of multi-bit values (weights and/or input activations) and a single bit signal indicates which of the multi-bit values equals zero. Therefore, the single bit signal also indicates which of the multi-bit values is non-zero. The sequence controller 235 streams single bit values and the associated multi-bit values for the weights to the PE 250. The single bit values form a weight zero mask that is stored in the weight zero mask register 255. Each single bit value for the weights controls whether the associated multi-bit weight value is stored into the weight registers 260. In one embodiment, the single bit signal controls an enable for a location where the associated weight would be stored. In one embodiment, when the multi-bit weight value is zero, the single bit signal disables (i.e., gates) the clock signal so that the location where the associated weight would be stored is not clocked to sample and store the associated weight. When the single bit signal indicates the associated weight is zero, the weight is discarded and is not stored into the weight registers 260. Not storing the weight reduces energy consumed by the weight registers 260.

The sequence controller 235 streams single bit values and the associated multi-bit values for the input activations to the PE 250. The single bit values form an input activation zero mask that is stored in the input activation zero mask register 256. Each single bit value for the input activations controls whether the associated multi-bit input activation is stored into the input activation registers 262. In one embodiment, the single bit signal controls an enable for a location where the associated input activation would be stored. In one embodiment, when the multi-bit input activation is zero, the single bit signal disables (i.e., gates) the clock signal so that the location where the associated input activation would be stored is not clocked to sample and store the associated input activation. When the single bit signal indicates the associated input activation is zero, the input activation is discarded and is not stored into the input activation registers 262. Not storing the input activation reduces energy consumed by the input activation registers 262.

The zero gating control unit 270 uses the input activation zero mask and the weight zero mask to control loading of the input registers 275. Not loading and storing the input activations and weights that are equal to zero reduces energy consumed by the input activation registers 262 and the weight registers 260, respectively. Importantly, maintaining the multiplier operands (e.g., multiplier and multiplicand inputs to the multiplier) at the logic levels output by the input registers 275, rather than toggling one or more bits of the operands to different logic levels when at least one of the operands equals zero, prevents signal switching within the multiplier 280, thereby reducing energy consumption by the multiplier 280. Because multiplication by zero just results in a zero, the zero gating control unit 270 switches the output of the multiplexer 285 between the output of the multiplier 280 and zero when at least one of the operands equals zero.

In one embodiment, the zero gating control unit 270 prevents the input activation registers 262 and weight registers 260 from updating the input activation and weight values output to the input registers 275 when either the input activation or the weight equals zero. When inputs to the input registers 275 are unchanged, it is not necessary to disable the input registers 275 to avoid loading a zero because signal switching will be limited to only the enable and clock signals.

In addition to reducing energy consumption for weights and input activations of zero, the DLA 200 architecture exploits sparse weights and activations. A dense encoding of sparse weights and activations is used to reduce the bandwidth needed to transmit the weight and activation values from the memory to the DLA 200, between different levels of the memory hierarchy, and between the different logic circuits within the DLA 200. Input data, such as weights and activations with zeros can be represented in a compact form. The amount by which the input data may be compacted increases as the number of zeros increases. However, even when only 10% of the multi-bit values equal zero, it may be worthwhile to encode the input data in a compacted data format. Encoding the sparse weights and/or activations reduces the data footprint, which allows larger matrices to be stored within a given size storage structure, such as the compact input activation buffer 230 and the compact weight buffer 220.

Figure 3A:
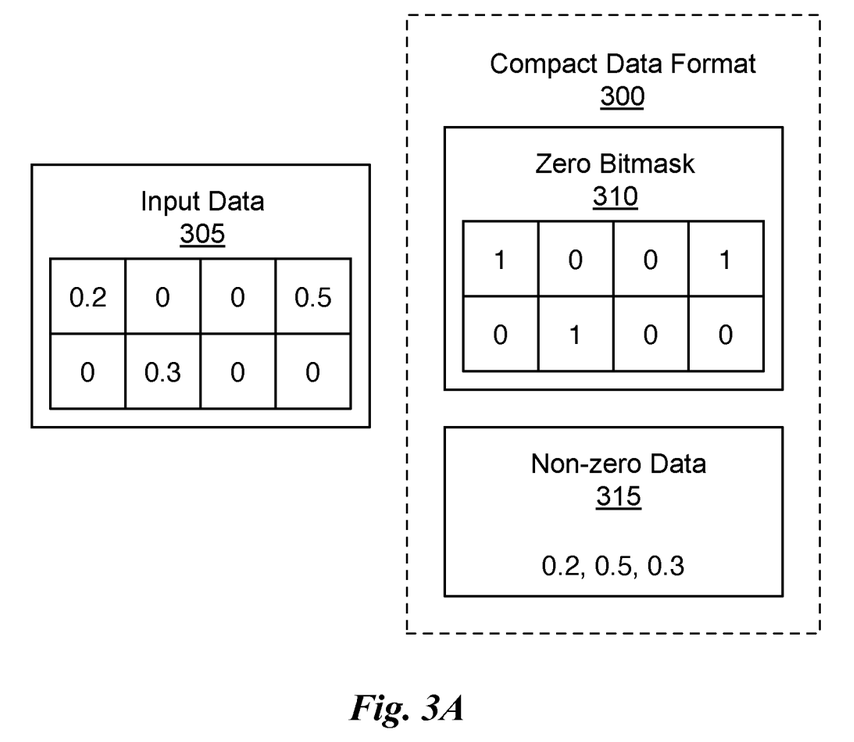
FIG. 3A illustrates a conceptual diagram of input data and compact data format, in accordance with one embodiment.

FIG. 3A illustrates a conceptual diagram of input data 305 and a compact data format 300, in accordance with one embodiment. The weights and activations are organized as matrices, such as the 2×4 matrix of the input data 305. The compaction engine 215 may be configured to convert the input data 305 to a compact data format 300. The non-zero values are extracted from the input data 305 to generate the non-zero data 315. A zero bitmask 310 is generated indicating positions of non-zero values and zeros in the input data 305. As shown in FIG. 3, the positions of non-zero values are indicated by bits set TRUE (e.g., logic one) and the positions of zeros are indicated by bits set FALSE (e.g., logic zero). In another embodiment, the positions of zeroes are indicated by bits set TRUE and the positions of non-zero values are indicated by bits set FALSE. Note that each bit in the zero bitmask corresponds to a setting of the single bit signal that is output by the expansion engine.

Figure 3B:
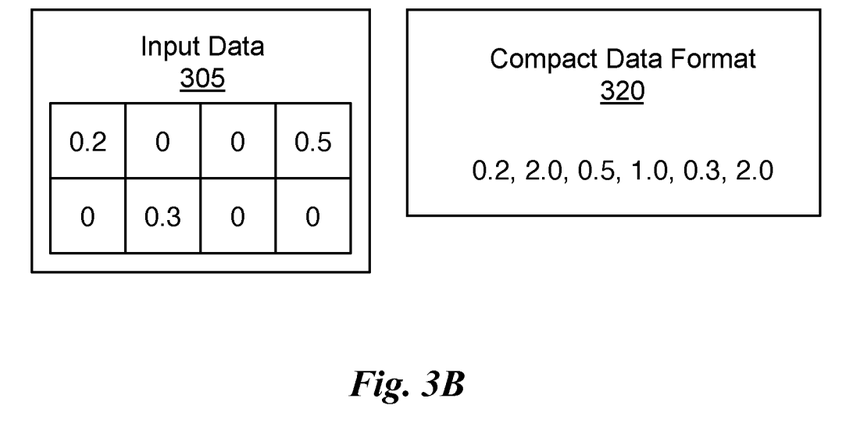
FIG. 3B illustrates a conceptual diagram of input data and another compact data format, in accordance with one embodiment.

FIG. 3B illustrates a conceptual diagram of input data 305 and another compact data format 320, in accordance with one embodiment. A run-length encoding scheme is used to generate the compacted multi-bit data encoded in the compact data format 320. The compact data format 320 includes each non-zero value and the number of zeros between each non-zero element.

Figure 4A:
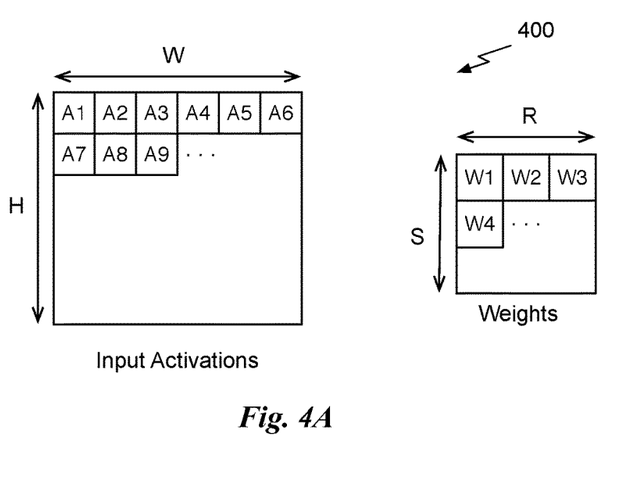
FIG. 4A illustrates input activations and weights for processing by the PE shown in FIG. 2B, in accordance with one embodiment.

FIG. 4A illustrates input activations and weights for processing by the PE 250 shown in FIG. 2C, in accordance with one embodiment. The input activations and weights are organized as matrices, with the input activations in a H×W matrix and the weights in an S×R matrix. The weights in a particular row of the S×R matrix are multiplied by each input activation in a corresponding row of the H×W matrix and each partial product is summed to produce a corresponding intermediate result (i.e., a partial sum). For example, a first partial sum corresponding to the first weight W1 is computed as W1×A1+W1×A2+W1×A3+W1×A4+W1×A5+W1×A6. A second partial sum corresponding to the second weight W2 is computed as W2×A1+W2×A2+W2×A3+W2×A4+W2×A5+W2×A6. A third partial sum corresponding to the third weight W3 is computed as W3×A1+W3×A2+W3×A3+W3×A4+W3×A5+W3×A6. The first, second, and third partial sums correspond to the first row of weights in the S×R matrix. Additional partial sums corresponding to the other rows of weights in the S×R matrix may be computed in a similar manner. For example, a fourth partial sum corresponding to the fourth weight W4 is computed by multiplying the weight W4 by each input activation in the second row of the input activations and summing the products, and so on.

The core operation in a CNN convolutional layer is a two-dimensional sliding-window convolution of an S×R element filter over a H×W element input activation plane to produce a H×W element output activation plane. There can be multiple (C) input activation planes, which are referred to as input channels. A distinct filter is applied to each input activation channel, and the filter output for each of the C channels are accumulated together element-wise into a single output activation plane. Multiple filters (K) can be applied to the same body of input activations to produce K output channels of output activations.

Figure 4B:
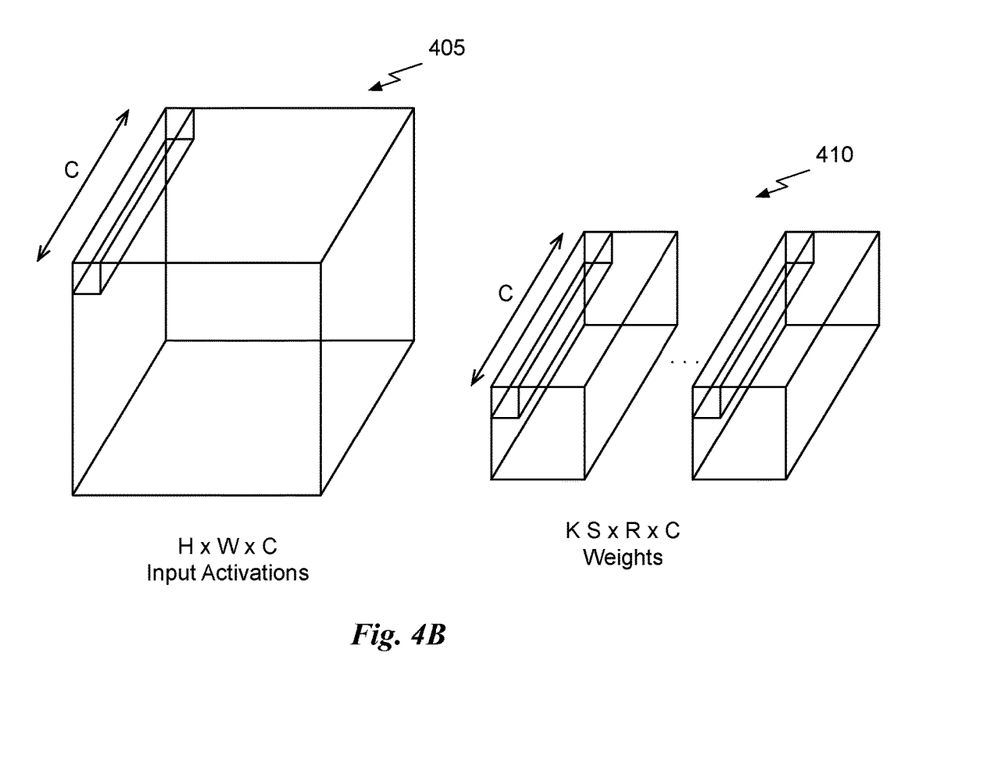
FIG. 4B illustrates input activations and filter weights for a single convolutional neural network (CNN) layer, in accordance with one embodiment.

FIG. 4B illustrates input activations and filter weights for a single CNN layer, in accordance with one embodiment. The input activations 405 are organized as a three-dimensional H×W×C matrix. The weights 410 for K filters are organized as K three-dimensional S×R×C matrices. The rectangular volumes in the input activations and weight matrices illustrate corresponding elements of the input activations and weights that are multiplied and accumulated.

Figure 5:
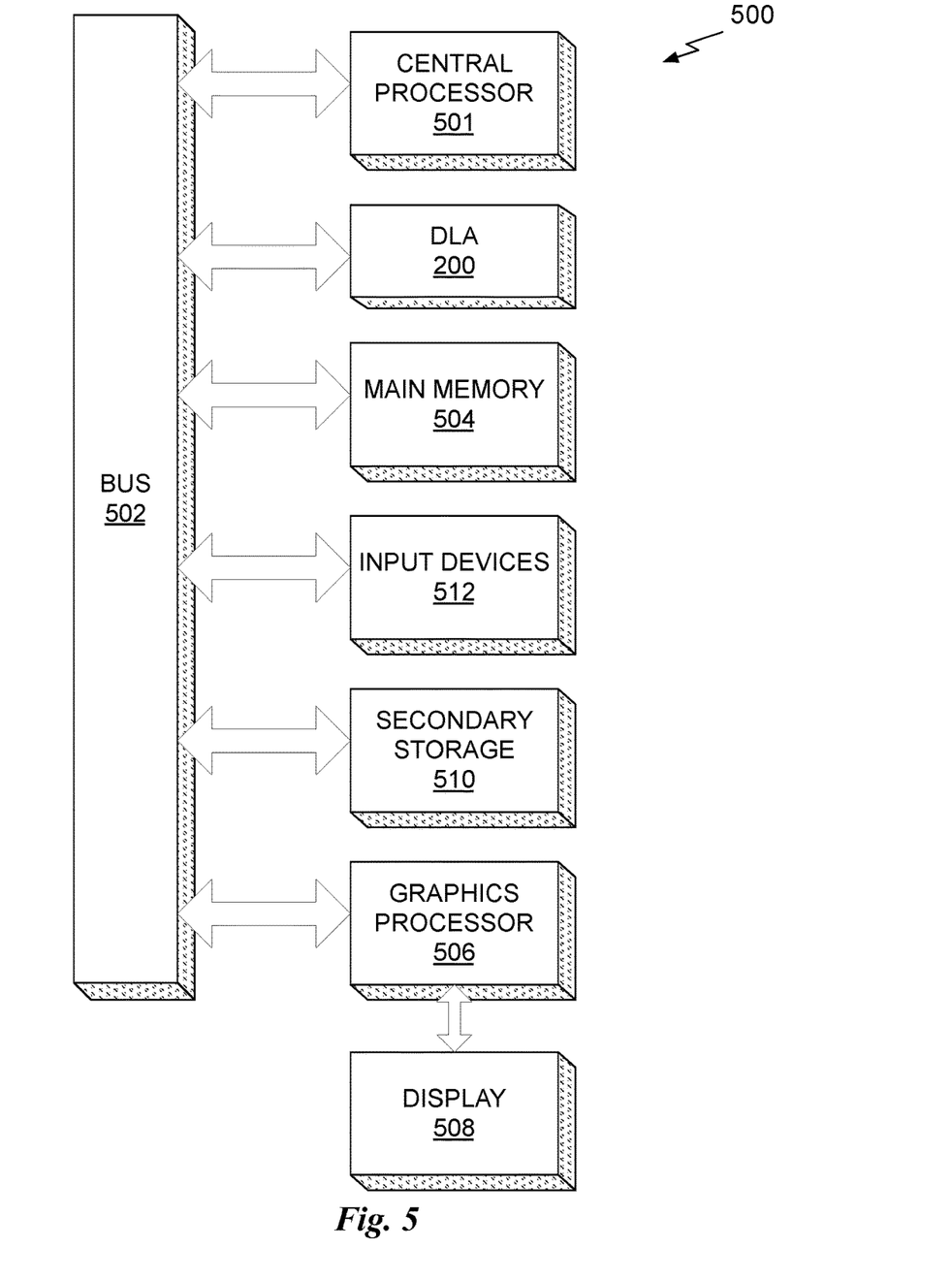
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one DLA 200 that is connected to a communication bus 502. The communication bus 502 may be implemented using any suitable protocol, such as PCI (Peripheral Component Interconnect), PCI-Express, AGP (Accelerated Graphics Port), Hyper-Transport, or any other bus or point-to-point communication protocol(s). The system 500 also includes a main memory 504. Control logic (software) and data are stored in the main memory 504 which may take the form of random access memory (RAM).

The system 500 also includes a central processor 501 (e.g., CPU), input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, input data for the DLA 200, output data generated by the DLA 200, and the like may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the DLA 200, central processor 501, the graphics processor 506, an integrated circuit (not shown) that is capable of at least a portion of the capabilities of one or more of the DLA 200, the central processor 501, and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game console, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, at a compaction engine, multi-bit data for input to a processing element;
   determining, by the compaction engine, that the multi-bit data equals zero; and
   transmitting a single bit signal from the compaction engine to the processing element in lieu of the multi-bit data, wherein the single bit signal indicates that the multi-bit data equals zero.

2. The method of claim 1, wherein determining that the multi-bit data equals zero comprises determining that the multi-bit data is less than a pre-determined threshold value.

3. The method of claim 1, further comprising generating a zero product value at an output of a multiplier while preventing signal switching within the multiplier.

4. The method of claim 3, further comprising disabling a clock signal configured to store the inputs to the multiplier in a plurality of registers.

5. The method of claim 3, further comprising, after storing the zero product, disabling a clock signal configured to store the output of the multiplier.

6. The method of claim 1, further comprising disabling an input register configured to store the multi-bit data, wherein the input register includes outputs that are coupled to a multiplier input.

7. The method of claim 1, wherein the multi-bit data represents a weight.

8. The method of claim 1, wherein the multi-bit data represents an input activation.

9. A system, comprising:
   a deep learning accelerator configured to:
   receive, at a compaction engine, multi-bit data for input to a processing element;
   determine that the multi-bit data equals zero; and
   transmit a single bit signal from the compaction engine to the processing element in lieu of the multi-bit data, wherein the single bit signal indicates that the multi-bit data equals zero.

10. A method, comprising:
receiving, at a memory interface, a compacted data sequence for input to a processing element;
transmitting the compacted data sequence from the memory interface to an expansion engine;
extracting, by the expansion engine, non-zero values from the compacted data sequence;
inserting zeros between the non-zero values to generate an expanded data sequence; and
outputting the expanded data sequence from the expansion engine to the processing element.

11. The method of claim 10, wherein a number of zeros to insert between each of the non-zero values is encoded in the compacted data sequence.

12. The method of claim 10, wherein a bitmask indicates a position in the expanded data sequence for each non-zero value of the non-zero values.

13. The method of claim 10, wherein the outputting comprises broadcasting the expanded data sequence to the processing element and additional processing elements.

14. The method of claim 10, further comprising:
receiving, by a compaction engine, a data sequence including zero values and non-zero values generated by the processing element;
encoding positions of each non-zero value into the compacted data sequence;
determining counts of zeros between the non-zero values; and
inserting the counts and non-zero values into the compacted data sequence.

15. The method of claim 14, further comprising, identifying values generated by the processing element that are less than a pre-determined threshold value as zero values.

16. The method of claim 10, wherein the expanded data sequence comprises a set of weights.

17. The method of claim 10, wherein the expanded data sequence comprises a set of activations.

18. The method of claim 10, further comprising transmitting a single bit signal to the processing element that indicates whether a value in the expanded data sequence is a zero value or non-zero value.

19. The method of claim 18, further comprising, based on the single bit signal, generating a zero product value at an output of a multiplier while preventing signal switching within the multiplier for each zero value in the expanded data sequence.

20. A system, comprising:
a memory storing a compacted data sequence; and
a deep learning accelerator configured to:
receive the compacted data sequence from the memory for input to a processing element; and
transmit the compacted data sequence from the memory interface to an expansion engine, wherein the expansion engine:
extracts non-zero values from the compacted data sequence and
inserts zeros between the non-zero values to generate an expanded data sequence that is output by the expansion engine to the processing element.

21. A system, comprising:
a memory storing a compacted data sequence; and
a deep learning accelerator configured to:
receive the compacted data sequence from the memory for input to a processing element; and
transmit the compacted data sequence from the memory interface to an expansion engine, wherein the expansion engine:
determines that the multi-bit data encoded in the compacted data sequence equals zero; and
transmits a single bit signal to the processing element in lieu of the multi-bit data, wherein the single bit signal indicates that the multi-bit data equals zero.

* * * * *